United States Patent [19]
Billes et al.

[11] Patent Number: 5,798,852
[45] Date of Patent: Aug. 25, 1998

[54] ALL-OPTICAL DEVICE FOR REGENERATING AN OPTICAL SIGNAL MODULATED IN AN RZ FORMAT

[75] Inventors: Laurent Billes; Jean-Claude Simon, both of Louannec; Ivan Valiente, Caouennec, all of France

[73] Assignee: France Telecom, Paris, France

[21] Appl. No.: 662,347

[22] Filed: Jun. 12, 1996

[30] Foreign Application Priority Data

Jun. 13, 1995 [FR] France ................. 95 06976

[51] Int. Cl.$^6$ ................................. H04B 10/00
[52] U.S. Cl. .................. 359/158; 359/176; 359/179
[58] Field of Search ........................ 359/158, 174, 359/179, 176, 139, 128, 175, 177, 188

[56] References Cited

U.S. PATENT DOCUMENTS

| | | | |
|---|---|---|---|
| 5,309,267 | 5/1994 | Huang | 359/179 |
| 5,353,146 | 10/1994 | Webb | 359/179 |
| 5,392,147 | 2/1995 | Kaede et al. | 359/181 |
| 5,463,488 | 10/1995 | Grimes | 359/128 |
| 5,513,030 | 4/1996 | Epworth | 359/187 |
| 5,526,162 | 6/1996 | Bergano | 359/158 |

FOREIGN PATENT DOCUMENTS

| | | | |
|---|---|---|---|
| A-0 571 134 | 5/1993 | European Pat. Off. | H04B 10/16 |
| A-2 219 903 | 5/1988 | United Kingdom | H04B 9/00 |

OTHER PUBLICATIONS

Journal of Lightwave Technology, Sep., 1994, USA, vol. 12, No. 9, ISSN, pp. 1648–1659.
Applied Physics letters, vol. 66, no. 19, May 8, 1995, pp. 2457–2459.
NTZ Nachrichtentechnische Zeitschrift, vol. 46, No. 11, Nov. 1, 1993, pp. 824–826.
Electronics Letters, Jan. 7, 1993, vol. 29, No. 1, pp. 107–109.
Swiss Federal Institute of Technology, Non–Linear Effects in Semiconductor Photonic Components, Zurich, Jan. 16, 1995, pp. 1–5.
Electronics Letters, 10ps Pulse All–Optical Discrimination Using a High–Speed Saturable Absorber Optical Gate, Apr. 27, 1995, vol. 31, No. 9, pp. 736 & 737.
Electronics Letters, Demonstration of All–Optical Mach–Zehnder Demultiplexer, Apr. 27, 1995, vol. 31, No. 9, pp. 749 & 750.
Optics Letters, vol. 18, No. 15, Aug. 1, 1993, pp. 1226–1228.
Electronics Letters, Dec. 8, 1994, vol. 30, No. 25, pp. 2128–2130.
Electromagnetics Institute Technical University of Denmark, Jan. 1995, pp. 101–103.
Derwent Info. 1994, Optical Signal Regenerator for All–Optical *Repeater* for Communications System–Applies Recovered and Received Deteriorated Optical Clock Signals to Sagnac Switch for Encoding to Generate Clean Optical Data Signal, 2 pages.

*Primary Examiner*—Rafael Bacares
*Attorney, Agent, or Firm*—Blakely Sokoloff Taylor & Zafman

[57] ABSTRACT

The device comprises a first opto-optical gate for resynchronization and a second opto-optical gate for amplitude regeneration, the signal output by the first gate being applied to the control input of the second gate. The device also includes an opto-optical gate for regenerating contrast which receives a signal to be generated both on a source input and on a control input. The opto-optical gate is a three-input Mach-Zehnder interferometer, with each of the two branches thereof having a respective semiconductor optical amplifier.

10 Claims, 4 Drawing Sheets

FIG. 4a
INCIDENT SIGNAL

FIG. 4b
SIGNAL OUTPUT FROM BLOCK

FIG. 4c
SIGNAL OUTPUT FROM BLOCK

FIG. 4d
SIGNAL OUTPUT FROM BLOCK

ALL-OPTICAL DEVICE FOR REGENERATING AN OPTICAL SIGNAL MODULATED IN AN RZ FORMAT

The present invention relates to an all-optical device for regenerating an optical signal that is intensity modulated in an RZ (return to zero) format.

BACKGROUND OF THE INVENTION

The device of the invention is advantageously used in the field of telecommunications for optical fiber transmission using two-state digital modulation.

Using purely optical techniques, it makes it possible to eliminate time jitter and also distortion applied to the signal by the transmission fiber, and to reduce amplitude noise.

It is well known that in an optical fiber transmission system operating at a high data rate by carrier (10 Gbit/s and above), the signal is subjected to a certain amount of deterioration that can seriously limit the range of the system:

attenuation;

distortion due to chromatic dispersion and polarization dispersion, and also, though to a lesser extent, to non-linear effects (phase self-modulation, etc, ... ). By way of example, a description of all of these phenomena can be found in:

[1] G. P. AGRAWAL: "Non-linear fiber optics", Academic Press, 1989.

Distortion generally gives rise merely to pulses becoming spread out in time, but, in some cases, it can also result in jitter of the time positions of pulses. This can deteriorate the quality of a link.

To combat attenuation on its own, use is made nowadays of erbium-doped optical fiber amplifiers.

To combat the above-mentioned distortions, several techniques are presently being investigated in the laboratory:

optoelectronic regeneration which consists in detecting the optical signal, in regenerating it by electronic circuits, and then in modulating an optical carrier with the regenerated signal; that technique is very effective but it is also very complex, and therefore difficult to make reliable at increasing data rate; most recent results mention circuits operating at 20 Gbit/s in the laboratory;

transmission by means of solitons which are light pulses that do not deform as they propagate along the fiber, because of equilibrium between chromatic dispersion and phase self-modulation induced by the Kerr effect; that technique would appear to be most promising for application to very long distance undersea transmission, but more difficult to implement for application to terrestrial transmission at data rates greater than 10 Gbit/s; and "all-optical" regeneration that does not make use of electronics for signal processing. A priori, this technique is simpler than the "optoelectronic" technique.

All-optical regeneration makes use of all-optical repeater regenerator resynchronizer ("3R") devices which in addition to performing an optical amplification function also regenerate the waveform of the initial signal by eliminating any jitter effect in the time positions of the pulses.

For a description of the general principle on which such devices are based, reference may advantageously be made to the following article:

[2] M. JINNO: "All-optical signal regularizing/ regeneration using a non-linear fiber Sagnac interferometer switch with signal-clock walk-off", Journal of Lightwave Technology, Vol. 12, No. 9, 1994, pp. 1648–1659.

Figure 1:
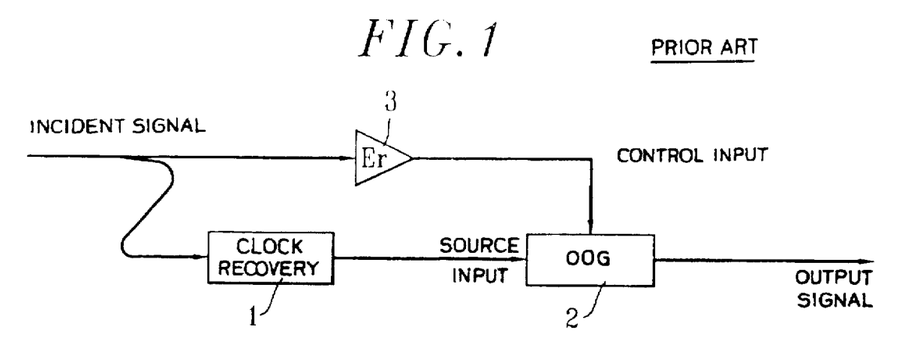
FIG. 1, as already described above, is a schematic showing the principle on which prior art 3R type all-optical repeater/regenerators are based.

The principle on which such a device is based is shown in FIG. 1.

The incident signal is split on input thereto. A portion of the signal is applied to a clock recovery stage 1.

This stage 1 is designed to regenerate the clock frequency and the phase of the distorted signal as received. It produces a train of short pulses that are perfectly synchronized with the basic frequency of the signal.

The other portion of the signal is amplified by an amplifier 3, e.g. an erbium-doped fiber, and it is applied to the control input of a regenerator stage 2 constituted by an opto-optical gate OXO whose other input, referred to as a "source input" receives the output signal from stage 1.

The opto-optical gate OOG is opened in non-linear manner with respect to power by a distorted pulse corresponding to the symbol "1" on its control input.

If the duration of an open period is considerably longer than that of a clock pulse present on the "source input" of the regenerator 2, then it is very probable that the pulse will pass through without being disturbed, providing the time jitter of the "1s" is not excessive.

The regenerator 2 will therefore produce a regenerated "1" pulse, leaving via the "source output" port of the gate OOG.

The energy of a "0" symbol in the distorted incident signal is insufficient to open the gate, and the synchronous clock pulse delivered by the stage 1 is blocked. A "0" is thus regenerated.

In practice, it is necessary for transmission through the gate OOG to depend little on fluctuations in the energy of the distorted incident signal and for said transmission to return quickly to a very low value after passing a distorted pulse.

Of the numerous publications that described "3R" type all-optical regenerator devices, reference may advantageously be made to the various publications listed below:

[3] H. AVRAMOPOULOS and N. A. WHITAKER: "Optical signal regenerator for all-optical repeater for comunication system", and corresponding patent application EP 0 571 134;

[4] J. K. LUCEK and K. SMITH: "All-optical signal regenerator", Optics Letters, Vol. 18, No. 15, 1993, pp. 1226–1228, both of which relate to complete repeater/generators including clock recovery, and in which the signal regeneration stage uses an opto-optical gate based on a non-linear mirror, whose non-linearity is due to the Kerr effect in an optical fiber of very great length;

[5] M. EISELT, W. PIEPER, and H. G. WEBER: "Decision gate for all-optical data retiming using a semiconductor laser amplifier in a loop mirror configuration", Electronics Letters, Vol. 29, No. 1, 1993, pp. 107–109, which describes a regeneration experiment implementing an opto-optical gate called "SLALOM" constituted by an optical fiber non-linear mirror which is an optical loop including a semiconductor optical amplifier (SOA);

[6] L. BILLES, I. VALIENTE and J. C. SIMON: "Modelling of a semiconductor optical amplifier based non-linear optical loop mirror", COST 240 workshop on non-linear effects in semiconductor photonic components, Zurich, Switzerland, 16 Jan. 1995, which analyzes a regeneration stage similar to that of the preceding publication, but in which the organization of the control and the source is different; and

[7] M. JINNO and T. MATSUMOTO: "Non-linear operations of 1.55 μm wavelength multielectrode distributed feedback laser diodes with their applications for optical signal processing", Journal of Lightwave Technology, Vol. 10, No. 4, 1992, pp. 448–457,
which describes a repeater/regenerator using bistable semiconductor lasers.

Nevertheless, prior art regenerators suffer from numerous drawbacks.

Devices using optical non-linearity due to the Kerr effect in optical fibers suffer from the defect of requiring a length of fiber that is several kilometers long, thereby making them bulky and precluding any possibility of monolithic integration. Stability and cost are therefore penalized. Also, output contrast can be limited intrinsically.

Semiconductor devices do not suffer from those defects, and could therefore be integrated, which would make them much easier to use.

However, given the relatively long time required for the non-linearity to return to equilibrium (15 picoseconds (ps) to 100 ps, depending on the type of operation and the structure of the amplifier) when compared with the Kerr effect in fibers, when the bit rate exceeds half the reciprocal of the recovery time of the non-linearity, it becomes very difficult to regenerate with satisfactory reduction of amplitude noise, as demonstrated in reference [6].

With prior art semiconductor-based devices, it is therefore necessary to find a compromise between reducing time jitter and reducing amplitude noise.

It should also be observed that the various prior art devices are liable to generate "1" pulses to replace "0" pulses that are not completely extinguished in the distorted signal.

OBJECTS AND SUMMARY OF THE INVENTION

The device of the present invention makes it possible to reduce or to eliminate the above-mentioned drawbacks. It proposes a structure comprising a cascade of opto-optical gates enabling both jitter and amplitude noise defects to be corrected simultaneously, in a manner that is better than that possible with opto-optical gates based on non-linear fibers or on semiconductor optical amplifiers as used at present as regenerators.

More particularly, the optical regenerator devices proposed by the invention make it possible to correct the following defects in the incident signal:

pulses spread out in time;

time jitter; and amplitude noise.

According to the invention, the solution consists in an all-optical device for regenerating an optical signal modulated in an RZ format, the device including an opto-optical gate whose control input receives an optical signal corresponding to the signal to be regenerated and whose source input receives an optical clock signal synchronized on the signal to be regenerated, the device including at least one second opto-optical gate whose control input receives the signal output by the first opto-optical gate and whose source input receives the optical clock signal, the first gate being a resynchronization gate, while the second gate is an amplitude regeneration gate.

It will be understood that the opto-optical gates of this cascade structure can be of the non-linear fiber type or of the semiconductor optical amplifier type.

The cascade structure considerably improves the correction of amplitude and of jitter for opto-optical gates based on semiconductor optical amplifiers.

For opto-optical gates based on non-linear fibers, the cascade structure also greatly improves signal contrast.

With such a regenerator device, a train of output pulses are obtained of unit duration equal to that of the clock pulses (or greater if necessary), carrying the message of the incident signal, without time jitter and with reduced amplitude noise.

Another and independent object of the invention is to propose a device enabling the contrast of the incident signal to be improved, and in particular to correct finite contrast defects therein.

Throughout the present text, the "contrast" of a signal is defined as being equal to $10.\log_{10}(P_1/P_0)$ where $P_1$ is the mean peak power of pulses corresponding to the "1" symbol and where $P_0$ is the mean peak power of pulses corresponding to the "0" symbol.

This contrast is finite if, at the beginning of transmission, the optical signal modulator device (e.g. an electro-optical modulator) is imperfect.

The solution proposed by the invention for improving the contrast of the incident signal is a device including an opto-optical gate which receives an optical signal to be regenerated both on its source input and on its control input, said gate being a contrast regeneration gate.

In yet another independent aspect, the invention proposes an opto-optical gate structure that advantageously replaces the optical gate structures conventionally used in the prior art for RZ regeneration.

Sagnac interferometer and semiconductor optical amplifier type opto-optical gates as described in [6] suffer from the drawback of being usable only with bit rates limited to $1/(DT+Tr)$, where DT is the duration of the transmission window and where Tr is the amplifier non-linearity recovery time.

More particularly, the invention provides a device constituted by an opto-optical gate comprises a Mach-Zehnder interferometer having three inputs, each of the two branches of said interferometer including a semiconductor optical amplifier, the source signal being applied on a first input of the interferometer and being split by the coupler of said input into two portions that travel through the two branches respectively of the interferometer, the control signal being applied to two optical lines, one connected to the second input of the interferometer and the other connected to its third input, the line connected to the third input including an attenuator and presenting an optical delay relative to the line connected to the second input, the portions of the control signal applied to the second and third inputs passing respectively through each of the two semiconductor optical amplifiers so that the pulses of the first portion open the opto-optical gate and the pulses of the second portion close said gate.

BRIEF DESCRIPTION OF THE DRAWINGS

Other characteristics and advantages of the invention appear further from the description below. The description is purely illustrative and non-limiting. It should be read with reference to the accompanying drawings, in which.

MORE DETAILED DESCRIPTION

Figure 2:
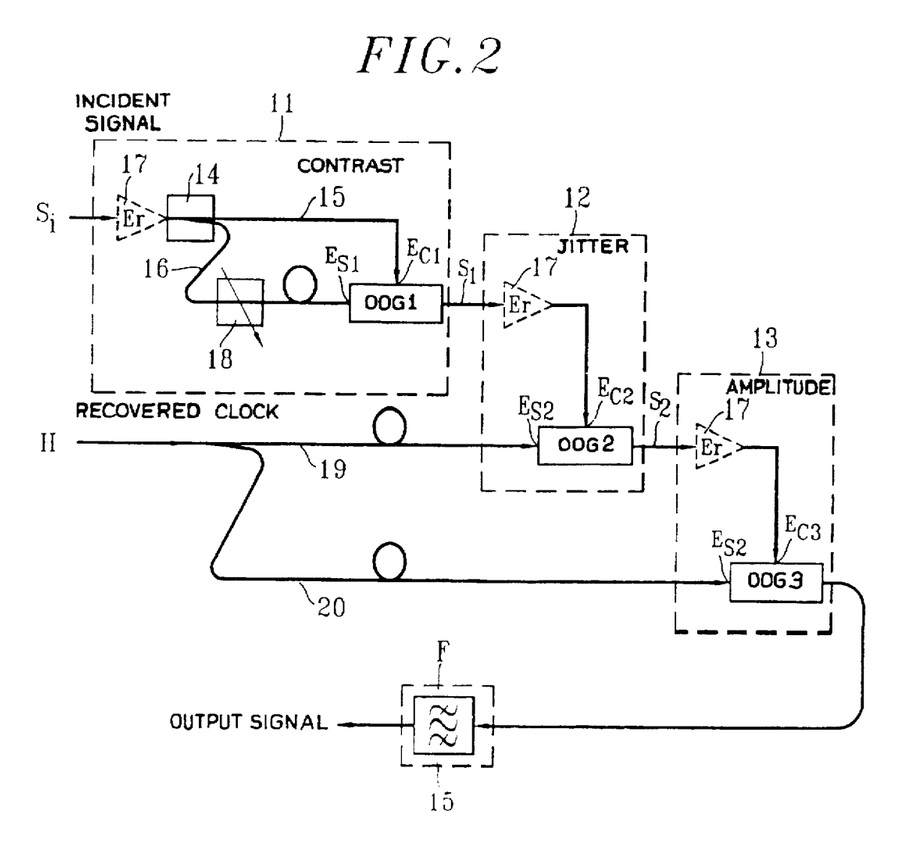
FIG. 2 is a schematic of an all-optical regeneration device proposed by the invention.

FIG. 2 shows the principle on which the invention is based. The device of the invention has three blocks referenced 11 to 13, each using a respective opto-optical gate OOG1, OOG2, or OOG3. Each of these blocks 11 to 13 is dedicated to a specific function:

the first block or block 11 regenerates the contrast of the incident signal;

the intermediate block 12 performs the resynchronization function; and the last block 13 performs amplitude regeneration.

The structure of these various blocks 11 to 13 is described below.

The block 11 has an optical coupler 14 with one input port and two output ports, together with two optical fiber lines 15 and 16 which connect the outputs of the coupler 4 firstly to the control input $E_{C_1}$ of the gate OOG1 and secondly to the source input thereof $E_{S_1}$.

The incident signal Si is received by an erbiumdoped optical fiber amplifier 17 which amplifies the signal upstream from the coupler 14.

An attenuator 18 is provided on the optical line 16 between the coupler 14 and the source input $E_{S_1}$. This line 16 also presents optical delay relative to the line 15 between the coupler 14 and the control input $E_{C_1}$.

The block 11 is designed to raise the contrast above a threshold which is typically 15 dB. It is necessary only if the contrast in the incident signal Si is less than said typical value.

The signal Si output from the block 11 thus corresponds to the incident signal Si with better contrast.

The position of the block 11 upstream from the blocks 12 and 13 is important, since that improves the efficiency of the blocks 12 and 13.

Regeneration proper is performed by the cascade structure of blocks 12 and 13.

This structure serves to separate the two aspects of resynchronization and of amplitude regeneration so as to distribute these two functions between the two blocks 12 and 13.

Each of these blocks 12 and 13 includes an opto-optical gate OOG2 or OOG3.

Each of these opto-optical gates receives at its source input $E_{S_2}$ or $E_{S_3}$ a signal taken from the same optical clock H. The optical signal emitted by the clock H is a clock signal recovered from the incident signal Si in a manner known per se by the person skilled in the art.

The two paths between the clock H and the source inputs $E_{S_2}$ and $E_{S_3}$ are given respective references 19 and 20.

The signal $S_1$ at the output from the gate OOG1 is amplified by an erbium optical fiber amplifier 17 and is then applied to the control input $E_{C_2}$ of the gate OOG2.

The signal output by the block 12 is a train of short pulses without time jitter.

This signal is likewise amplified by an erbium optical fiber amplifier 17 and it is applied to the control input $E_{C_3}$ of the gate OOG3.

At the output from block 13, an optical signal is thus obtained having time characteristics that are identical to those at the output from block 12, but with considerably reduced amplitude noise.

Finally, an optical filter F is optionally provided at the output of the regenerator constituted by the cascade of the three blocks 11 to 13 to adjust the duration of pulses in the final signal, should that be necessary.

The operation of the above cascade structure is described below.

A light pulse in the incident signal Si reaching the input of block 11 is split by the optical coupler 14.

The pulse applied to the ports $E_{C_1}$ controls the opto-optical gate OOG1 and opens a transmission time window.

The pulse applied to the source input $E_{S_1}$ of the gate OOG1 is attenuated by the element 18 so as to behave in essentially linear manner in the gate OOG1.

The delay in the path 16 compared with the path 15 is determined so that a pulse arrives at the source input $E_{S_1}$, at an instant that corresponds to the middle of a time window opened by the same pulse on the control port $E_{C_1}$. It will be observed that since two components of a single starting pulse are caused to interact, the delay is constant from one bit to another and is independent of any time jitter that may affect the incident signal.

The output signal corresponds to the source signal Si multiplied by the transmission factor of the block 11.

A low power pulse corresponding to a "0" has a small transmission factor $T_0$ whereas a higher power pulse corresponding to a "1" has a greater transmission factor $T_1$.

The mean value $T_1$ of the transmission factor of the gate OOG1 for "1s" in the message corresponding to the signal Si is therefore greater than the non-zero mean value $T_0$ applied to the "0s" of the message.

For finite contrast $C_0 = 10.\log_{10}(P_1/P_0)$ in the incident signal, the power of the output signal is equal to the input power multiplied by the transmission factor.

The output contrast is therefore:

$C_1 = 10.\log_{10}(P_{output1}/P_{output0}) \approx C_0 + C_t$ where $C_t = 10.\log_{10}(T_1/T_0) > 0$ is the ratio of the transmission factors for "1s" and "0s".

Contrast is thus improved between the input and the output of the gate OOG1.

The power difference between the "0s" and the "1s" of the incident signal is increased by the processing performed by the stage 11.

It will be observed that a conventional characteristic of opto-optical gates is that they have a transfer function that is non-linear with power, thereby cleaning up background noise in the "0s" of the control signal.

So far as the Applicant is aware, proposals have not previously been made to apply a sequence of pulses both to the source input and to the control input of an opto-optical gate in order to regenerate contrast.

The function of the block 12 is to resynchronize the signal.

The light pulses emitted by the clock H and reaching the input $E_{S_2}$ are delayed relative to the incident signal Si by means of an optical delay line so as to reach the opto-optical gate OOG2, ideally in the middles of the time windows opened by the signal $S_1$.

The output signal $S_2$ from the gate OOG2 corresponds to the pulses of the clock signal modulated with the message of the incident signal Si.

The block 12 transfers the information in the incident signal to clock pulses that are clean since they have been created locally and are free from jitter, and it thereby eliminates time jitter.

Because there is no need to act simultaneously to reduce amplitude noise, it is possible to work with transmission windows that are very wide and thus to absorb a very high level of time jitter.

The total width of the time window is less than the bit time. By way of example, it is selected to be equal to the sum of twice the expected jitter amplitude plus the width of the pulses in the incident signal Si.

The pulses of the signal $S_2$ are characterized by the following parameters:

no time jitter;

width corresponding to the width of the clock pulses; and amplitude noise that depends, for each pulse, on the operating point, i.e. on the instant at which the clock pulse arrives relative to the time window opened by the corresponding pulse of the signal $S_1$; since this operating point is not constant, there may be a slight deterioration in pulse amplitude fluctuation compared with the incident signal.

The function of the block 13 is to regenerate amplitude.

The control input $E_{C3}$ of its gate OOG3 receives the signal $S_2$ output by the block 12; the source input $E_{S3}$ receives the optical clock signal over the path 20.

Given that the control signal $S_2$ has no time jitter, the clock pulses of the signal conveyed by the path 20 always reach the gate OOG3 at the same relative moment within the transmission time windows opened by the pulses of the signal $S_2$. Any pulse passing through the gate OOG3 therefore does so with a transmission factor that depends only on the energy of the control pulses $S_2$.

The mean energy of the pulses reaching the input $E_{C3}$ of the opto-optical gate OOG3 is selected to take advantage of the non-linear aspect of the energy response of the opto-optical gate OOG3. For this purpose, the mean energy is adjusted (at amplifier 17 upstream from the input $E_{C3}$ or by acting on the energy of the clock pulses) so as to correspond to transmission through said gate OOG3 presenting little sensitivity to control energy.

The time windows opened by the various "1" value control pulses then present substantially identical transmission factors regardless of their binary pattern, but over short time periods.

The time offset between the line 20 and the line 19 is adjusted so that the clock pulses of the line 20 reach the source input $E_{S3}$ of the gate OOG3 in the middles of said short time periods.

When using opto-optical gates based on semiconductor optical amplifiers, this greatly reduces patterning effects due to the recovery time constraints inherent to the semiconductor devices used in the gates. This makes it possible to use a higher bit rate for given characteristics of the regenerated signal, and is made possible only by the time offset between the control pulses and the clock pulses being constant.

The output signal corresponds to the regenerated signal in the form of light pulses emitted at the wavelength of the clock signal. This signal is characterized by the following parameters:

no time jitter;

amplitude noise reduced compared with the incident signal;

improved contrast compared with the incident signal, providing the incident signal (on gate OOG2) already has contrast better than a threshold which depends on the wave in which the gates are made, and is typically 15 dB; this requirement for incident signal contrast to be kept above a threshold explains the usefulness of having the contrast regeneration block as a first block; and width: that of the clock pulses.

The control pulses delivered at the output of block 13 are short and without time jitter.

It will be observed that optimizing regeneration quality leads to the use of rather short clock pulses (preferably less than one-tenth of the bit time, e.g. lying in the range about one-tenth to about one-twentieth of the bit time). If it is desired to avoid occupying excessive spectrum compared with the bit rate, it suffices, for example, to use a narrow optical filter centered on the central wavelength of the clock so as to reduce the spectrum of the output signal and thus obtain pulses that are wider. The duration of the clock pulses is therefore not a limitation.

The opto-optical gates OOG1 to OOG3 may be of any known type, e.g. of the type described in reference [6].

Other opto-optical gate structures could also be envisaged.

The gates described in reference [6] suffer from the drawbacks, as mentioned above, of being suitable for use only with bit rates limited to $1/(DT+Tr)$ where DT is the duration of the transmission window and where Tr is the recovery time of amplifier non-linearity.

To mitigate that drawback, it is possible to envisage using a semiconductor high-speed saturable absorber as described in:

[8] A.HIRANO et al.: "10 ps pulse all-optical discrimination using a high-speed saturable absorber optical gate", Electronics Letters, Vol. 31, No. 9, 1995, pp. 736–737.

Nevertheless, such components do not yet have sufficient performance since they present large amounts of loss (about 10 dB) and since they require control energy that is about ten times greater than that required by opto-optical gates using semiconductor optical amplifiers.

The opto-optical gate proposed by the invention serves to achieve a bit rate that is greater than the reciprocal of the recovery time of the gain or of the phase of the SOAs it uses, which represents an improvement by a factor of about 2 compared with a gate of the type given in reference [6].

Figure 3:
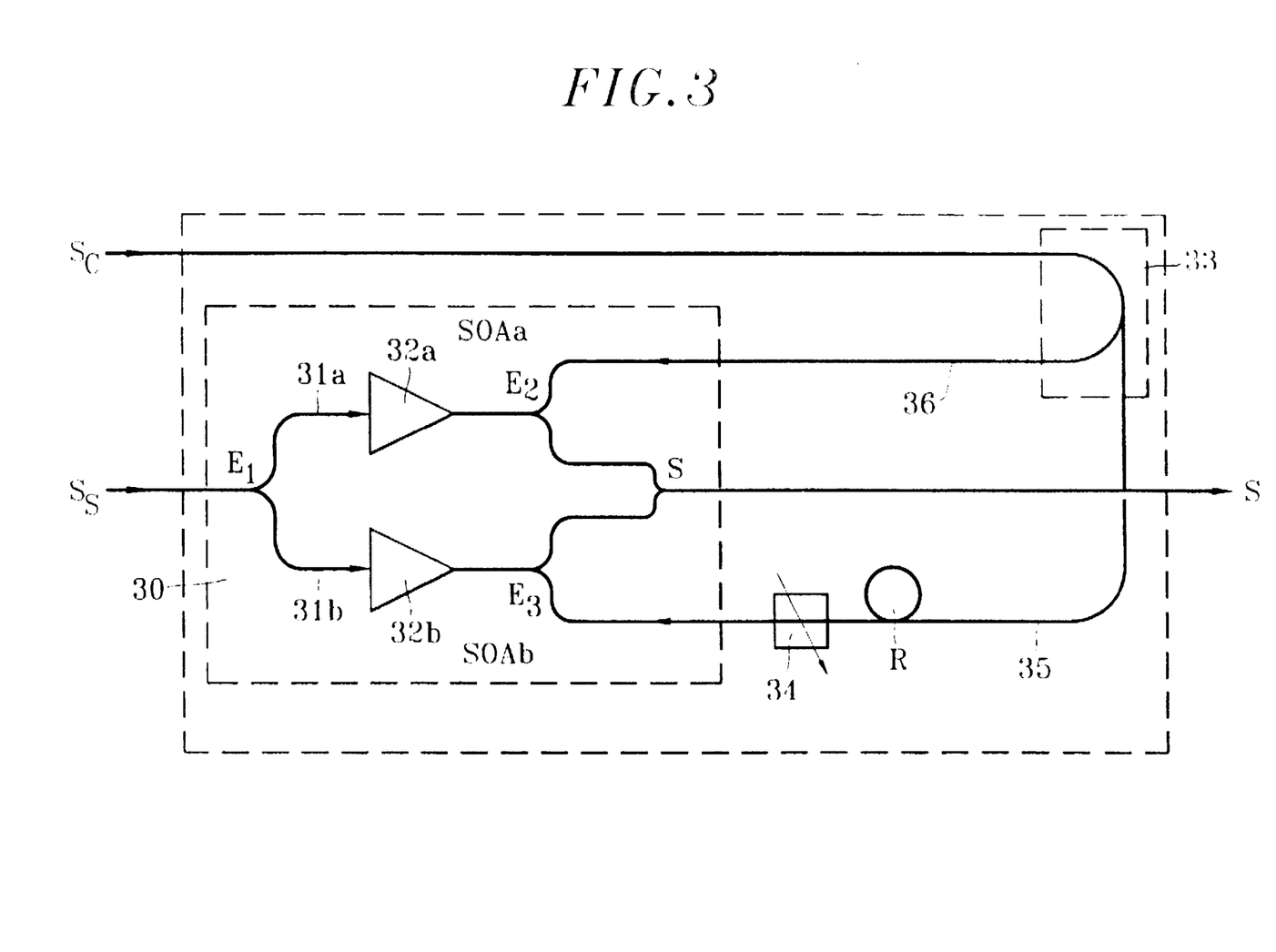
FIG. 3 is a schematic of an opto-optical gate structure proposed by the invention, and particularly advantageous for regenerating pulses that are intensity modulated in an RZ format.

The opto-optical gate proposed by the invention is shown more particularly in FIG. 3.

It comprises a Mach-Zehnder interferometer 30 having an output S and three inputs $E_1$, $E_2$, and $E_3$, with each of the two branches 31a and 31b being provided with a respective semiconductor optical amplifier (SOA) 32a or 32b. The signal $S_S$ reaching the input $E_1$ is split into two portions each travelling along one of the two branches 31a and 31b. The signals reaching the inputs $E_2$ and $E_3$ travel respectively along the branches 31a and 31b, passing through the amplifiers 32a and 32b in the opposite direction to the signal split by the input $E_1$.

A structure of this type has already been described in the following publication:

[9] M. SCHILLING et al.: "Wavelength converter based on integrated all-active three-port Mach-Zehnder interferometer", Electronics Letters, Vol. 30, No. 25, 1994, pp. 2128–2130, to which reference may advantageously be made for further details on how such a structure can be implemented, and the teaching thereof is included herein by reference.

The use made of such a structure in [9] is remote from that made in the invention. It will be observed, in particular, that in [9] one of the input branches which is present for reasons of symmetry is not actually used.

The input $E_1$ constitutes the source input of the opto-optical gate constituted in this way. The control signal $S_C$ is applied by an optical coupler 33 to each of the two inputs $E_2$ and $E_3$.

The output signal S from the Mach-Zehnder interferometer is the source output signal.

In FIG. 3, the coupler 33, the input couplers $E_1$, $E_2$, and $E_3$, and the output S of the interferometer 30 are all power divider couplers (50/50).

In a variant, these couplers could be directional couplers. Selecting directional couplers for the interferometer 30 facilitates adjustment of light and dark fringes.

The optical line 35 between the optical coupler 33 and the input $E_3$ has an optical delay R relative to the line 36 between the optical coupler 33 and the input $E_2$. An optical attenuator 34 is also provided on the optical line 35.

The light paths over the branches 31a and 31b are such that in the absence of a pulse on the inputs $E_2$ or $E_3$ of the interferometer, the interferometer is in equilibrium and no signal is output on the gate S.

Applying a control pulse to the input $E_2$ of the interferometer 30 unbalances it so the output S passes light (a time window has been opened). The window is closed by subsequently sending a second control pulse of lower energy to input $E_3$. The gains of the amplifiers 32a and 32b are thus matched at the instant the gate closes, thereby bringing the interferometer back into equilibrium.

A gate is thus obtained which opens and closes cleanly and which is not duration limited within the bit time.

It makes it possible to achieve bit rates of the order of 1/Tr where Tr is the non-linearity recovery time, and this is independent of the duration of the transmission window, thus making it possible to absorb a higher level of time jitter.

A higher bit rate will end up by setting a floor in the reduction of "1" amplitude variations due to the patterning effect, where transmission through the gate for any one bit depends on the preceding bits.

It may be observed that this is not achievable with the non-linear mirror presented in [6], which has only one amplifier.

It is also possible to superpose a continuous light beam on the control signal $S_C$ for the purpose of holding the optical amplifiers so as to improve the dynamic range of gain and phase recovery, a described in:

[10] R. J. MANNING and G. SHERLOCK: "Recovery of a n-phase shift in 12.5 ps in a semiconductor laser amplifier", Electronics Letters, Vol. 31, No. 4, 1995, pp. 307–308.

Since the source and the control propagate in opposite directions through the device, it is also easy to operate at the same wavelength for the source and for the control, since only source pulses are presented on the output S.

In a variant, the source and control beams can propagate in the same direction through the interferometer, with a filter centered on the wavelength of the source signal being provided at the output from the gate to remove the control beams.

Such a gate is particularly well suited to the cascade structure regenerator devices proposed by the invention, but it can be used more generally for any all-optical regenerator device.

It will be observed that the idea of applying a closing pulse to the gate after applying an opening pulse thereto has already been proposed in the following publications for time demultiplexing applications by means of a Michelson interferometer or a Mach-Zehnder interferometer using non-linear optical waveguides:

[11] N. STORKFELT: "Functional components in advanced optical communication systems", Ph.D. thesis, Technical University of Denmark, Jan. 1995, LD115, pp. 101, 103; and

[12] S. NAKAMURA, K. TAJIMA and Y. SUGIMOTO: "High-repetition operation of a symmetric Mach-Zehnder all-optical switch", Applied Physics Letters, Vol. 66, No. 19, 1995, pp. 2457–2459.

The structure proposed by the invention is particularly suited to regenerating RZ format pulses. It is also simpler than that described in references [11] and [12] since it does not need an output filter for eliminating control pulses, given that they propagate in the opposite direction to the signal which is to be regenerated.

Proposals have also been made in:

[13] K. J. KANG et al.: "Demonstration of all-optical Mach-Zehnder de multiplexer", Electronics Letters, Vol. 31, No. 9, 1995, pp. 749–750.

for an opto-optical gate for time demultiplexing constituted by a Mach-Zehnder interferometer having two SOAs, used with a gate opening pulse and with a delayed pulse for closing the gate.

Splitting into two pulses for each of the two SOAs is performed by means of the output coupler of the MachZehnder interferometer, and that means it is not possible to adjust the powers of the pulses applied to each of the SOAs independently. This point is of no importance in the demultiplexing application proposed in reference [13] where the only requirement is for a narrow transmission window. However, such a structure could not be used in the RZ format pulse regeneration applications envisaged in the invention since they require wide time windows.

The architecture of the opto-optical gate proposed by the invention makes it possible to adjust the pulse powers in each of the branches differently, with such different adjustment ensuring equilibrium between the two branches for all instants after the closing pulse has reached the interferometer.

An example of the cascade structure is now described.

The parameters of the input signal were as follows:

bit rate: 10 Gbit/s;

full width at half maximum (FWHM): 20 ps;

contrast: 10 dB;

relative energy variations in "1" bits: 7%; and time jitter: 8 ps.

The clock signal was constituted by pulses of duration equal to 4 ps at a repetition frequency of 10 GHz.

The opto-optical gates OOG1 to OOG3 were of the type described with reference to FIG. 3.

Their control energy thresholds were of picojoule order.

The typical bit rate used of 10 Gbit/s corresponds to an amplifier having a recovery time of 100 ps, and such amplifiers are now available.

Nevertheless, using a continuous light beam for holding purposes of the type described in reference [10] made it possible to obtain a phase recovery time of about 15 ps. A bit rate of about 80 Gbit/s with the gate based on a Mach-Zehnder interferometer having multiple inputs as shown in FIG. 3 can therefore be envisaged.

The results obtained are given in FIGS. 4a to 4d in the form of optical eye diagrams of the input signal to block 11 and of the signals output from the various blocks 11 to 13.

Figure 4A:
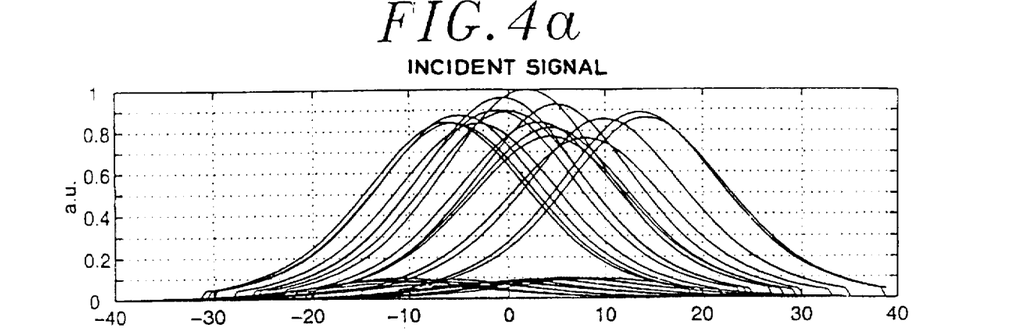
FIG. 4a to 4d are eye diagrams of the incident signal at the FIG. 2 device, and of the signals output by the first, second, and third blocks of said device.
Figure 4B:
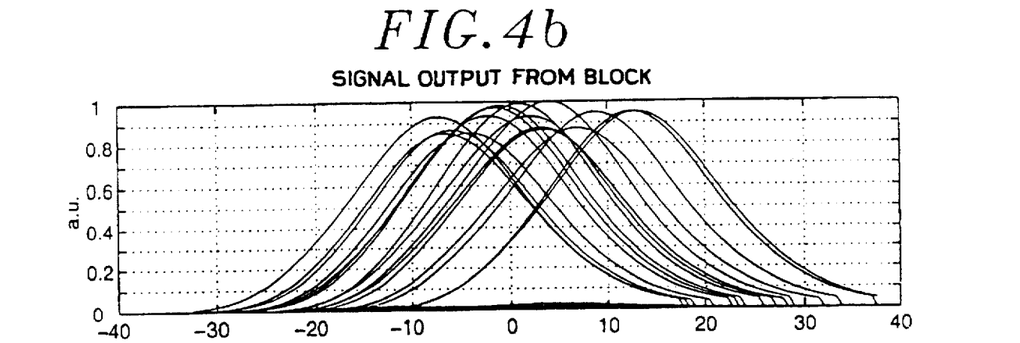

By comparing FIGS. 4a and 4b, it can be seen that the signal output by block 11 has much greater contrast than the incident signal Si. The gain is 8 dB.

Figure 4C:
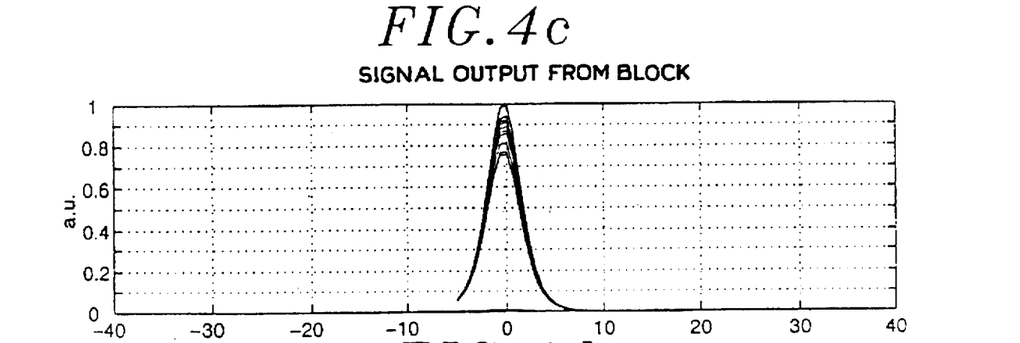

By comparing FIGS. 4b and 4c, it can be seen that the signal is resynchronized in block 12 (time jitter eliminated), but that there remain variations in amplitude at the output from this block.

Figure 4D:
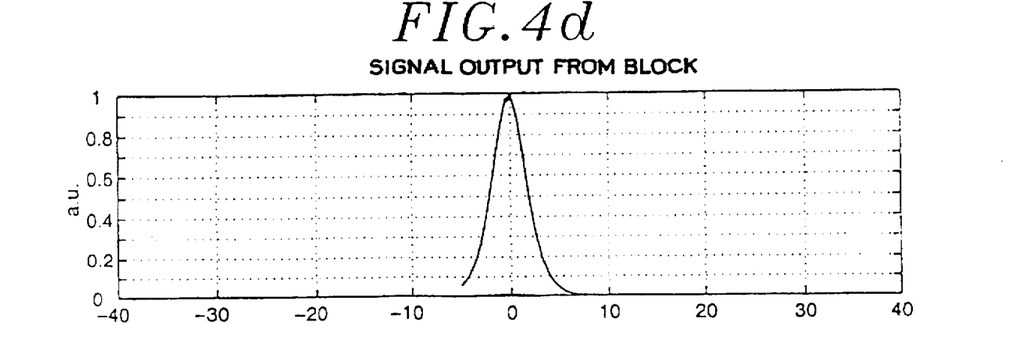

Block 13 reduces these amplitude variations (output standard deviation 0.6%, giving gain by a factor of 10 compared with the incident signal).

Figure 5A:
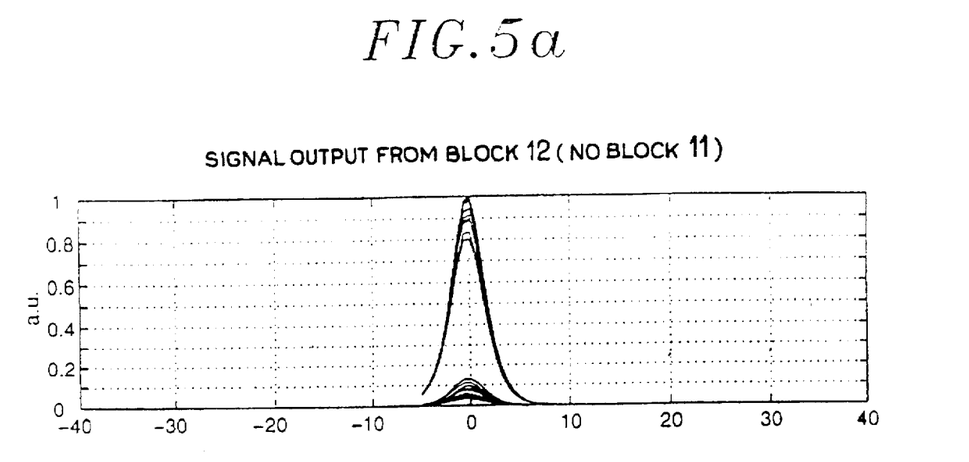
FIGS. 5a and 5b are eye diagrams of the signals output by the second and third blocks of the FIG. 2 device in the absence of the first block.
Figure 5B:
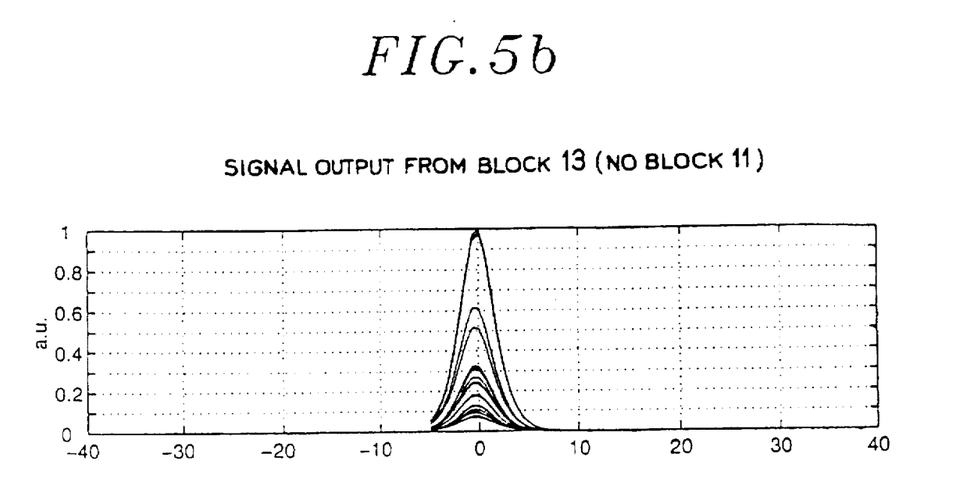

FIGS. 5a and 5b show the signals obtained at the outputs of the blocks 12 and 13 for the same incident signal but in the absence of block 11.

Since contrast was not high enough at the inputs of blocks 12 and 13, the functions of resynchronizing and of regenerating amplification of "1s" were indeed performed, but at the cost of degraded contrast, giving rise to high levels of transmission during "0s".

With reference again to FIGS. 4a to 4d, it can be seen that block 11 serves to raise the contrast of the incident signal above a threshold of 15 dB. The blocks 12 and 13 improve it further raising it to 30 dB.

With respect to noise, the cascade structure proposed by the invention has the advantage that the only noise having a direct effect is noise in the last opto-optical gate to be passed through.

The noise contributed by the gates in the preceding blocks tends to be eliminated on going from one block to the next by the non-linear transfer functions of the gates. The only noise contribution that remains is that of the last gate which is due to the amplified spontaneous emission of SOAs. This gives a residual noise factor equal to $N_{s,e}/4N_{sp}$, where $N_{s,e}$ is the number of photons present per pulse at the source input of the last gate (optical clock) and where $N_{sp}$ is the spontaneous emission parameter of its SOA(s).

Specifically, with the parameters of the example described above, this contribution is negligible. The regenerator device improves the signal-to-noise ratio of the incident signal by a factor close to 20 dB.

As will easily be understood, the structure described above for the regenerator device of the invention is not limiting.

Additional processing stages may be added on the same principle as the blocks 12 and 13.

It is also possible to put the various blocks in series with other opto-optical gates, using the principle already described in the French patent application filed under the number 94/14639, with the teaching thereof being included herein by reference.

The optical signal is applied to the control inputs of the various gates and the source output of one of the gates is fed to the source input of the next. Such an organization obtains a further improvement in contrast, depending on the characteristics of the incident signal and the desired output quality. In such an organization, it is possible to envisage using an SOA under gain crossed saturation conditions as an opto-optical gate, with the special feature of such a gate being an inverter.

We claim:

1. An all-optical device for regenerating an optical signal modulated in an RZ format, the device including an opto-optical gate whose control input receives an optical signal corresponding to the signal to be regenerated and whose source input receives an optical clock signal synchronized on the signal to be regenerated, the device including at least one second opto-optical gate whose control input receives the signal output by the first opto-optical gate and whose source input receives the optical clock signal, the first gate being a resynchronization gate, while the second gate is an amplitude regeneration gate.

2. A regenerator device according to claim 1, including an opto-optical gate which receives an optical signal to be regenerated both on its source input and on its control input, said gate being a contrast regeneration gate.

3. A device according to claim 1, wherein an opto-optical gate comprises a Mach-Zehnder interferometer having three inputs, each of the two branches of said interferometer including a semiconductor optical amplifier, the source signal being applied on a first input of the interferometer and being split by the coupler of said input into two portions that travel through the two branches respectively of the interferometer, the control signal being applied to two optical lines, one connected to the second input of the interferometer and the other connected to its third input, the line connected to the third input including an attenuator and presenting an optical delay relative to the line connected to the second input, the portions of the control signal applied to the second and third inputs passing respectively through each of the two semiconductor optical amplifiers so that the pulses of the first portion open the opto-optical gate and the pulses of the second portion close said gate.

4. A device according to claim 2, wherein the contrast regeneration gate is situated upstream from the resynchronization and amplitude regeneration gates, the signal output by said contrast regeneration gate being applied to the control input of the resynchronization gate.

5. A device according to claim 2, including a coupler which splits the signal to be regenerated and sends two portions of the split signal over two optical lines, one connected to the control input of the contrast regeneration opto-optical gate, and the other to its source input.

6. A device according to claim 5, wherein the second of said two lines presents an optical delay relative to the first line, said delay being such that the light pulses of the signal to be regenerated reach the source input of the contrast regeneration opto-optical gate in the middles of the time windows opened by the same pulses reaching the control input.

7. A device according to claim 1, wherein the resynchronization gate has a time window equal to twice the sum of the amplitude of the expected jitter in the signal to be regenerated plus the width of the pulses in the incident signal.

8. A device according to claim 1, including means for adjusting the mean energy of the pulses reaching the control input of the amplitude regeneration gate so as to correspond to transmission by said gate having small sensitivity relative to the control energy.

9. A device according to claim 3, wherein the second and third inputs of the interferometer are situated on the branches thereof downstream from the semiconductor optical amplifiers relative to the travel direction of the source signal portions along the two branches of the interferometer, the portions of the control signal travelling along the branches of the interferometer in the opposite direction to the source signal.

10. A device according to claim 1, wherein the clock signal pulses have a duration of less than one-tenth the bit time.

* * * * *